United States Patent Office 2,758,272
Patented Aug. 7, 1956

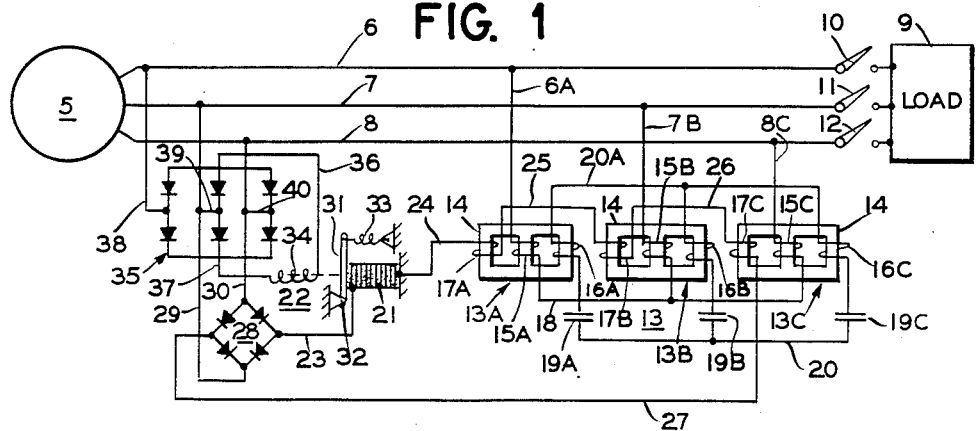

2,758,272

VOLTAGE REGULATION SYSTEM

Paul W. Franklin, Nutley, N. J., assignor to Bendix Aviation Corporation, Teterboro, N. J., a corporation of Delaware Application April 29, 1952, Serial No. 284,940

1 Claim. (Cl. 322—47)

The present invention relates to an excitation system for dynamoelectric machines and more particularly to a self-excitation system for induction generators.

Induction dynamoelectric machines, particularly the type having a squirrel cage rotor, are sometimes used as an alternating current generator by running slightly above synchronous speed and providing reactive energy for excitation. Normally the reactive energy is provided by a capacitor bank connected in the output of the machine. In order to maintain constant voltage with varying load, it is necessary to change the value of the capacitor bank. Heretofore, mechanical means have been used to change the values of the capacitor banks.

In the present invention, capacitors of fixed values are connected in the secondary of a saturable transformer. The transformer ratio is controlled by a D. C. winding energized from the output voltage in accordance with a condition of the output voltage.

An object of the invention is to provide an improved regulation system for an induction generator.

Another object of the invention is to provide a novel regulation system for a dynamoelectric machine.

Another object of the invention is to provide a novel and improved excitation system for an induction generator.

Another object of the invention is to provide improved means for excitation and regulation of a dynamoelectric machine.

The above and other objects and features of the invention will appear more fully hereinafter from a consideration of the following description taken in connection with the accompanying drawing wherein three embodiments of the invention are illustrated by way of example. It is to be understood, however, that the drawings are for the purpose of illustration only and are not designed as a definition of the limits of the invention.

In the drawing:

Figure 1 is a schematic diagram illustrating one embodiment of the invention.

Figure 2 is a schematic diagram illustrating another embodiment of the invention.

Figure 3 is a schematic diagram illustrating a further embodiment of the invention.

Reference is now made to Figure 1, wherein there is illustrated diagrammatically a generator 5 which may be of a conventional induction type, such, for example, as a squirrel cage type. The generator 5 is connected by conductors 6, 7 and 8 to a load 9. Switch members 10, 11 and 12 may be inserted in the respective conductors 6, 7 and 8 to control the connection to the load 9.

A novel feature of the present invention is the means of excitation and regulation for the generator 5. A transformer bank indicated generally by the numeral 13 comprises transformers 13A, 13B and 13C, each of which has a three legged core 14 with primary windings 15A, 15B and 15C, secondary windings 16A, 16B and 16C and control windings 17A, 17B and 17C wound on separate legs of the cores of the respective transformers.

One end of the respective primary windings 15A, 15B and 15C are connected by conductors 6A, 7B and 8C to the output conductors 6, 7 and 8. The other ends of the windings 15A, 15B and 15C are connected together by conductor 18.

Capacitors 19A, 19B and 19C have one side thereof connected to one end of the secondary windings 16A, 16B and 16C respectively. The other side of the capacitors 19A, 19B and 19C are connected together by a conductor 20. The other ends of the windings 16A, 16B and 16C are connected together by a conductor 20A.

While the transformer bank 13 is shown for purposes of illustration as being Y-connected, it is understood that it could be delta- or a combination of delta-Y-connected as well.

The D. C. windings 17A, 17B and 17C are connected in series with a carbon pile element 21 of a regulator indicated generally by the numeral 22, by conductors 23, 24, 25, 26 and 27 across the output of a rectifier 28. The input terminals of the rectifier 28 are connected by conductors 29 and 30 across the output lines 7 and 8. The regulator 22 is illustrated diagrammatically as having an armature 31 pivoted at 32 and biased by a spring 33 in a direction for decreasing the resistance of the carbon pile element 21. An electromagnetic winding 34 biases the armature 31 in a direction opposing the spring 33 so as to increase the resistance of the carbon pile element 21.

The winding 34 is connected across the output of rectifier 35 by conductors 36 and 37. The input of the rectifier 35 is connected by conductors 38, 39 and 40 to the output lines 6, 7 and 8.

In operation, reactive energy is provided by the capacitors 19A, 19B and 19C. The capacitors are selected to produce a predetermined voltage at a predetermined speed of the generator 5 with some intermediate value of pile resistance. As the output voltage varies, the excitation of the control winding varies causing a change in the current flowing in the D. C. windings of the transformer bank. This effects a change in the saturation and effectively changes the ratio of the transformer. This change in ratio of the transformer bank causes a change in the current flowing in the capacitors and thereby the reactive energy. By connecting the D. C. windings in series, a first harmonic feed back in the D. C. windings is avoided.

Reference is now made to Figure 2 in which like parts have been assigned the same reference numerals as in Figure 1 and only that portion differing from Figure 1 will be described in detail.

In addition to the D. C. excitation for the control windings obtained from the output of the rectifier 28, a D. C. current proportional to load is obtained from current transformers 46, 47 and 48. Primary windings 46A, 47A and 48A are connected in series in the respective output lines 6, 7 and 8. Secondary windings 46B, 47B and 48B are connected to the input terminals of rectifier 49. While the secondary windings 46B, 47B and 48B are shown delta-connected, it is understood that they may be Y-connected as well. One output terminal of the rectifier 49 is connected by conductor 50 to the conductor 24. The other output terminal of the rectifier 49 is connected by conductor 51 to the conductor 27.

In operation, by combining the currents from the output of the rectifiers 28 and 49, a control current is obtained that is a function of both voltage and load. By the addition of the current from the current transformers, the load on the carbon pile element is relieved as the change in excitation due to change in load is supplied from the load responsive source. Thus, the current in the control winding of the transformer bank is responsive to both load and voltage conditions of the output circuit.

In the embodiment disclosed in Figure 3, capacitors 19A, 19B, 19C are connected to the output circuit of the generator 5 by saturable reactors 52, 53 and 54. Each of the reactors 52, 53 and 54 has a core 52A, 53A and 54A; alternating current windings 56, 57 and 58; and D. C. windings 59, 60 and 61. The alternating current windings 56, 57 and 58 are wound on one leg of the respective cores 52A, 53A and 54A and have one end thereof connected by conductors 6A, 7A and 8A to the respective output lines 6, 7 and 8 and the other ends connected to respective capacitors 19A, 19B and 19C. The capacitors 19A, 19B and 19C are connected together by a conductor 62.

The D. C. windings 59, 60 and 61 are wound on the other leg of the respective cores 52A, 53A and 54A and are connected across the output of rectifier 28 in series with the carbon pile element 21 by conductors 23, 24, 25, 26 and 27.

The carbon pile regulator 22 is connected and controlled in the same manner as that of Figure 1.

In operation, the capacitors are connected to the generator terminals by the saturable reactors 52, 53 and 54 and the current flowing in the capacitors is controlled by the D. C. windings in accordance with a condition of the output voltage. Resonance is not approached, since for power factors of 0.75 and above, with a generator magnetizing current of 20 per cent or more, the maximum reactor reactance does not approach the capacitor reactance to more than 80 per cent, and thus does not approach resonance. However, in the embodiment of Figure 3 some overvoltage under certain conditions may be expected. Such overvoltages, however, will not be excessive.

Although several embodiments of the invention have been illustrated and described, various changes in the form and relative arrangement of the parts, which will now appear to those skilled in the art, may be made without departing from the scope of the invention.

What is claimed is:

Regulating means for an induction generator having a plurality of output lines, comprising a capacitor for each of said output lines, saturable transformers for connecting said capacitors to the respective output lines, control windings for each of said transformers, means connecting said control windings in series, means including a carbon pile regulator so connected to said output lines as to produce a component of current for energizing said control windings variable in accordance with the voltage across said output lines, and means including current transformers so connected in said output lines as to produce a component of current for energizing said control windings variable in accordance with the current in said output lines, said two components of current being so combined in said control windings as to provide a cumulative energization for said control windings.

References Cited in the file of this patent

UNITED STATES PATENTS

| | | |
|---|---|---|
| 1,797,268 | Lee | Mar. 24, 1931 |
| 1,815,516 | Lee | July 21, 1931 |
| 1,849,820 | Belt | Mar. 15, 1932 |
| 2,435,214 | Haug | Feb. 3, 1948 |
| 2,574,438 | Rossi et al. | Nov. 6, 1951 |

FOREIGN PATENTS

| | | |
|---|---|---|
| 405,234 | Great Britain | 1934 |